(12) United States Patent
Miraftabzadeh et al.

(10) Patent No.: US 10,452,451 B2
(45) Date of Patent: Oct. 22, 2019

(54) SYSTEMS AND METHODS FOR SCHEDULING OF WORKLOAD-AWARE JOBS ON MULTI-CLOUDS

(71) Applicants: Seyed Ali Miraftabzadeh, San Antonoio, TX (US); Peyman Najafirad, San Antonio, TX (US)

(72) Inventors: Seyed Ali Miraftabzadeh, San Antonoio, TX (US); Peyman Najafirad, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 82 days.

(21) Appl. No.: 15/620,345

(22) Filed: Jun. 12, 2017

(65) Prior Publication Data

US 2017/0357532 A1    Dec. 14, 2017

Related U.S. Application Data

(60) Provisional application No. 62/348,796, filed on Jun. 10, 2016.

(51) Int. Cl.
| | |
|---|---|
| *G06F 9/455* | (2018.01) |
| *G06F 9/50* | (2006.01) |
| *G06Q 30/02* | (2012.01) |
| *H04L 12/24* | (2006.01) |

(52) U.S. Cl.
CPC .......... *G06F 9/505* (2013.01); *G06F 9/5083* (2013.01); *G06Q 30/0283* (2013.01); *H04L 41/5019* (2013.01)

(58) Field of Classification Search
CPC .... G06F 9/44505; G06F 9/505; G06F 9/5072; G06F 9/5083
See application file for complete search history.

(56) References Cited

U.S. PATENT DOCUMENTS

| | | | | |
|---|---|---|---|---|
| 9,621,427 | B1 * | 4/2017 | Shah | ................... G06F 9/45533 |
| 2013/0346227 | A1 * | 12/2013 | Jain | ........................ G06Q 30/08 |
| | | | | 705/26.3 |
| 2014/0123129 | A1 * | 5/2014 | Risbood | .............. G06F 9/44505 |
| | | | | 717/176 |
| 2015/0215332 | A1 * | 7/2015 | Curcic | ................ H04L 63/1433 |
| | | | | 726/25 |
| 2016/0261713 | A1 * | 9/2016 | Seago | ..................... H04L 67/32 |

\* cited by examiner

*Primary Examiner* — Dong U Kim
(74) *Attorney, Agent, or Firm* — Thomas Horstemeyer, LLP

(57) ABSTRACT

Disclosed are systems and methods for optimally provisioning tasks to machine instances. The machine instances can correspond to cloud providers and can be part of a multi-cloud. The machine instances can each have various resources available. The task can be received from a user including a job profile. A ranking can be determined for the machine instances. Based on the ranking, the task can be provisioned to one or more of the machine instances.

19 Claims, 14 Drawing Sheets

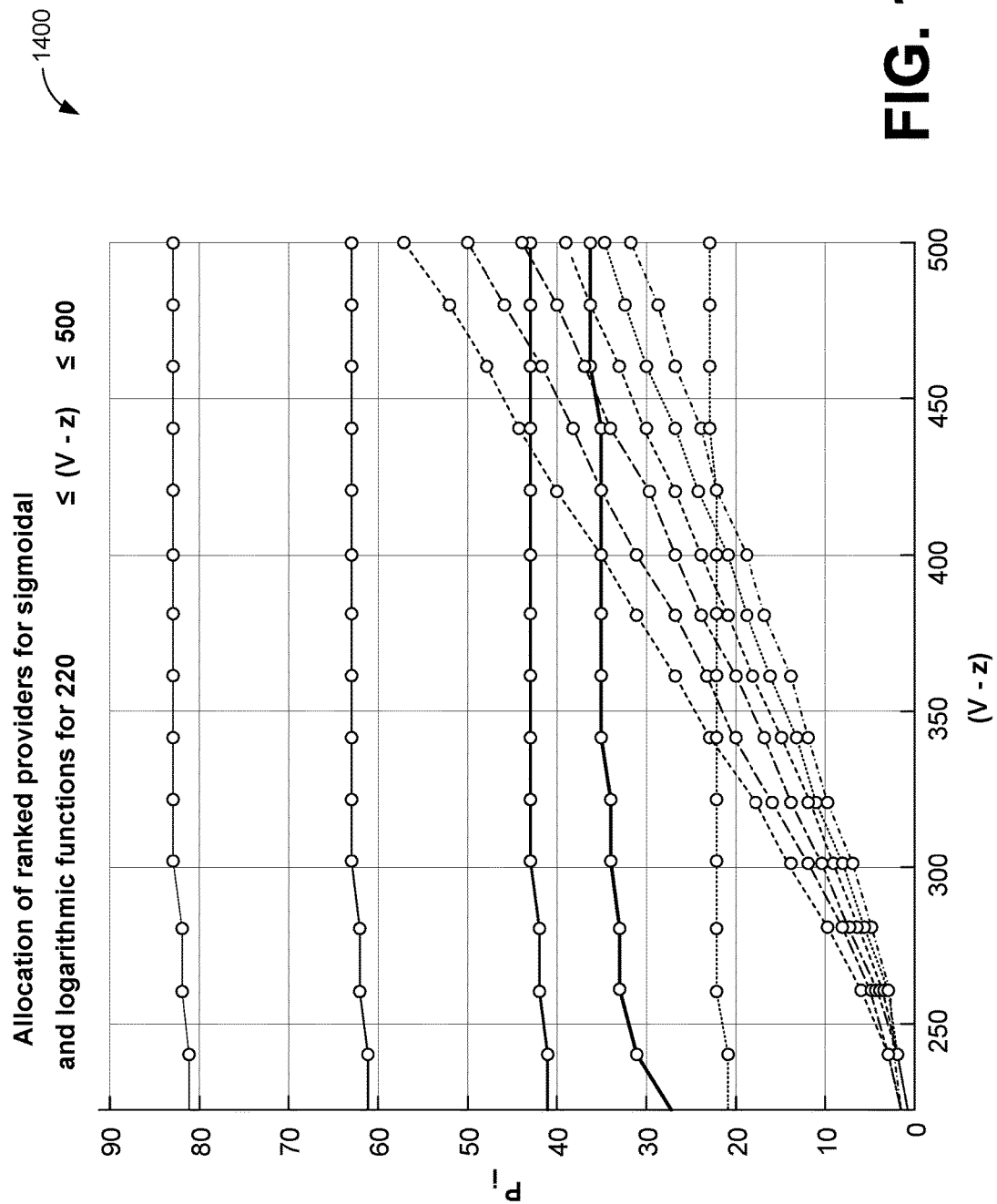

SYSTEMS AND METHODS FOR SCHEDULING OF WORKLOAD-AWARE JOBS ON MULTI-CLOUDS

CROSS-REFERENCE TO RELATED APPLICATION

This application claims the benefit of and priority to U.S. Provisional Patent Application No. 62/348,796 filed on Jun. 10, 2016 entitled "Efficient Distributed Algorithm for Scheduling Workload-Aware Jobs on Multi-Clouds," the content of which being incorporated by reference in its entirety herein.

GOVERNMENT LICENSE RIGHTS

This invention was made with government support under Grant Number 1419165 awarded by the NSF. The government has certain rights in the invention.

BACKGROUND

Cloud computing focuses on the monetary focal point while promising flexibility and high performance for users and cost efficiency for operators. Furthermore, taking advantage of virtualization technology results in better resource utilization and more return on investment (ROI) in a cloud computing environment. Because cloud resources are naturally perishable, it is important to maximize resource utilization within the cloud to avoid wasting the non-storable cloud resources. In addition, cloud computing is increasing its penetration among industry, research institutes, and universities across applications, which means cloud computing faces a variety of demands. Multi-cloud deployments allow different cloud providers to share resources for increased scalability and reliability, while implicitly increasing resource utilization, revenue of the demands, and hosting capability for a variety of demands types. Aforementioned advantageous of multi-cloud deployments have encouraged developers to explore ways for making robust scheduling algorithms faster and more reliable.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 14 is a graph illustrating characteristics of the distribution process, including the behavior of the elastic tasks, by changing the scaling factor according to various embodiments of the present disclosure.

DETAILED DESCRIPTION

Figure 1:
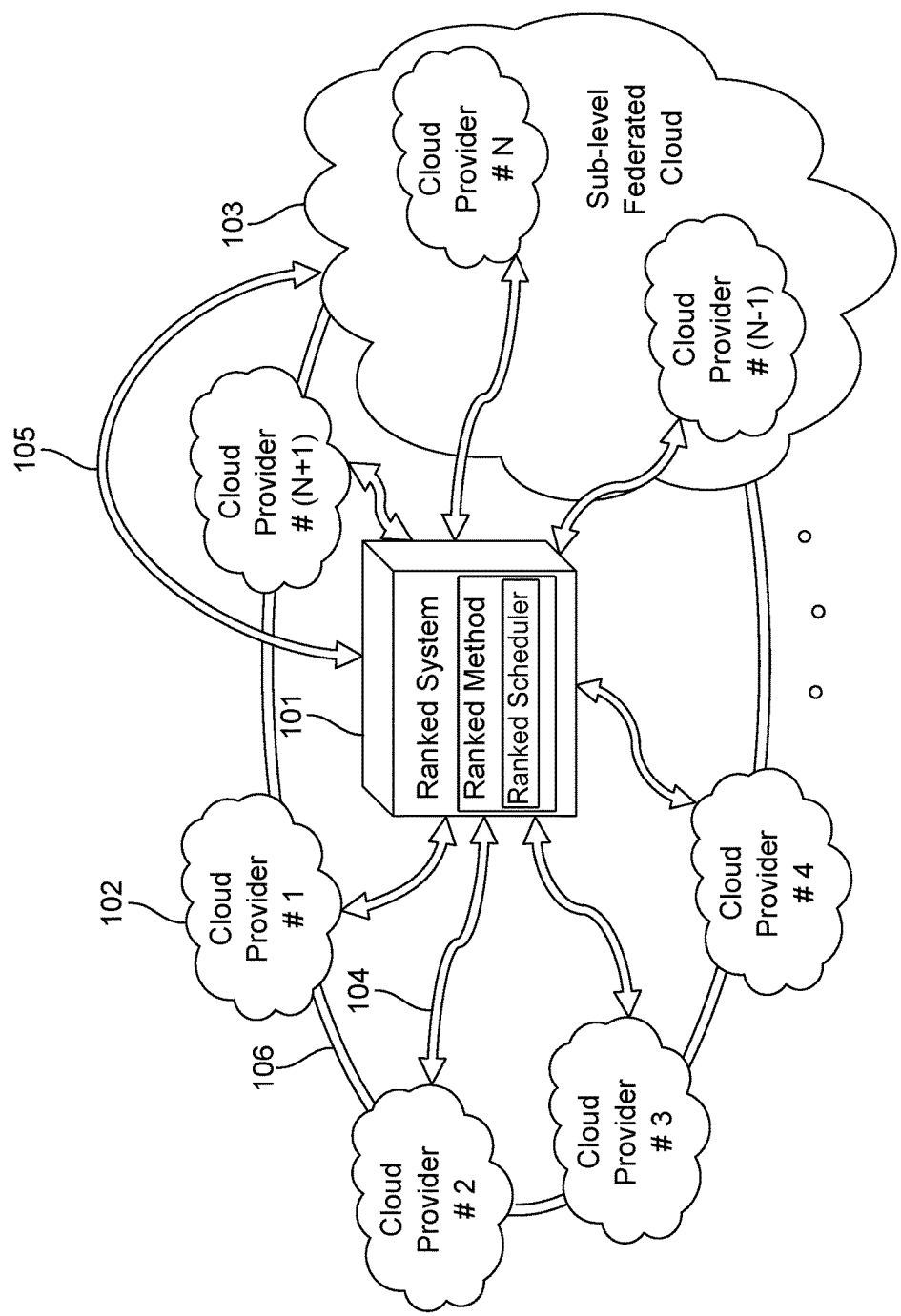
FIG. 1 illustrates a ranked system for dynamically provisioning of resources in a networked environment according to various embodiments of the present disclosure.

The present disclosure relates to a dynamic distributed algorithm for provisioning of resources to support a heterogeneous multi-cloud environment. Heterogeneity in a multi-cloud environment can include the presence of more diverse sets of resources and constraints that aggravate competition among providers. A variety of jobs can be assigned to available resources while maximizing the user revenue and provider profits. A dynamic distributed algorithm can be designed with a smart architecture for use with a one shot scheduler.

Sigmoidal and logarithmic functions can be used as utility functions to meet constraints, such as, for example, constraints indicated in a service level agreement (SLA). Spot instances that are implemented as the elastic tasks can be supported with logarithmic functions. The process can be configured to ensure sigmoidal functions are given priority over the elastic tasks. The systems and methods used herein can include diverse sets of resources scheduled in a multi-cloud networked environment based on a ranked process in a time window "slice." A multi-dimensional self-optimization problem in distributed autonomic computing systems can be used to maximize the revenue and diminish cost of services in pooled aggregated resources of a multi-cloud environment.

Despite traditional distributed computing systems, such as a grid, cloud computing can be focused on the monetary focal point while providing flexibility, high performance for users, and cost-efficiency for operators. Furthermore, taking advantage of the virtualization technology can result in gains of more resource utilization and better returns on investment (ROI).

The worldwide spending on public cloud services has been increasing exponentially. In addition, cloud computing has been increasing its penetration among industry, research institutes, universities, and other applications. An increasing amount of computing is performed on public clouds, such as Amazon's EC2, Windows Azure, Rackspace, Google Compute Engine, and other public clouds, in addition to private clouds, such as those hosted by enterprise using open source OpenStack software. In addition, a number of cloud computing research test beds and production sites, such as Chaemelon or JetStream, have been supported by National Science Foundation (NSF) to support academic research.

Among different forms of delivering cloud services, Infrastructure as a Service (IaaS) is one of the fastest growing categories. IaaS can be used to provide on-demand access to an elastic pool of configurable and virtual computational services (e.g., computing power, storage, and networks) in a pay-as-you-go manner. IaaS providers can offer computational services in the form of Virtual Machine (VM) with specific resource characteristics such as computing power, memory, disk space, and networking bandwidth along with types of operating systems and installed applications.

With an increase in customers using cloud services, a variety of types of cloud services are available, and an emergence of cloud computing providers and profit maximization for customers and providers can be an entangled problem with respect to minimizing the cost using resource management, improving performance in networking and applications, and maximizing revenue. Profit can be maximized for customers and providers by providing multi-price services, market segmentation, and prognostication the demands.

Because of the natural perishable characteristics of cloud resources, maximizing resource utilization can include minimizing a waste of non-storable cloud resources. A service level agreement (SLA) is a contract between two parties that guarantees a level of service. The level of service can include Quality of Service (QoS), which can impose robust constraints on services provided. The need to satisfy an SLA can increase the complexity of maximizing profit.

A multi-cloud deployment can allow different cloud providers to share resources for increased scalability and reliability. By sharing resources, the multi-cloud can integrate resources from different providers in a way that access to the resources is transparent to users and the cost is reduced. Furthermore, a multi-cloud can be used to maximize a provider profits by leasing part of the available resources from the provider's computing center to other providers, such as, for example, by way of a requested bid from the other providers. Multiple providers and users of cloud systems can maximize resource utilization while maintaining maintaining QoS requirements.

Maximizing a resource utilization can include a resource allocation decision that involves determining which resources are available to the user, how many resources are available to the user, where the available resources are located, and when to make the resources available to the user.

A user can choose a type and quantity of cloud resources that the user wants to acquire. A provider can fulfill the user's needs using nodes in the provider's datacenter. Running an application efficiently can involve matching the type of the resources that the application needs and the workload characteristics of the computing resources available. In addition, the quantity of resources provided can be selected based on meeting constraints in an SLA corresponding to a user's needs.

A pay-as-you-go pricing model involves when users can request and return resources dynamically and only pay for the resources used. Time scheduling, including scheduling adjustments, can be an important consideration when using a pay-as-you-go pricing model. To maximize resources utilization, a job scheduler can allocate desired resources to individual jobs. In parallel, the job scheduler can also ensure that each individual job is provided with adequate resources. In some embodiments, the job scheduler can provide each individual job with its fair share of available resources.

The requirements of a job scheduler become more complex in the cloud computing as a heterogeneous environment with two players: cloud providers and cloud users. Cloud users can have fluctuating loads with a variety of applications and requests. The consolidated cloud environments can be constructed from a variety of machine classes, representing different options in configuring computing power, memory, and storage. A multi-cloud can be a multi-part heterogeneous system as a result of sharing diversity sets of datacenters in terms of technical performance and monetary strategies.

Jobs can be scheduled by optimizing scheduling of resources in a multi-cloud environment. A multi-dimensional self-optimizing processes in distributed autonomic computing systems can be used to optimize resource allocation for a datacenter resources in a multi-cloud environment. As a bridge between providers and users, utility functions can include theoretical properties in the functions' practical use for autonomic computing systems. The utility functions can be manipulated to enable matching of collection of autonomic elements. This manipulation can be used to continually optimize the use of computational resources in a dynamic and heterogeneous environment. Job scheduling can be performed on a provider's system to maximize revenue and diminish costs of the services produced.

Based in part on Sigmoidal and Logarithmic utility functions, the processes and systems described can accomplish dynamic and scalable job scheduling in the heterogeneous multi-cloud environment for cloud services, such as IaaS and other services. Management effort and service provider interactions can also be minimized in parallel. The algorithm can rapidly provide and release multi-cloud pool resources.

With respect to a ranked system in a heterogenous multi-cloud environment, two main stakeholders in the cloud computing environment can be considered, including cloud providers and cloud customers. Cloud providers can produce various services and cloud customers, also referred to herein as cloud users or tenants, and cloud providers can be clients of the cloud providers and consume the produced services. The cloud customers can have operative influence on the produced services. For example, the cloud producers can make the cloud computing environment as a heterogeneous system to fulfill on cloud customer demands. Additionally, cloud providers can deploy heterogeneous cloud computing datacenters.

Collaboration across multi-cloud environments can involve strapping monitoring and management mechanisms. The strapping monitoring and management mechanism can be a key component for provisioning, scheduling, and failure management. Efficiently provisioning computing resources in a pool of heterogeneous datacenters can be performed by using a ranking method, as will be discussed in more detail below.

A dynamic sequence of the available resources can be produced based on the hierarchical characteristics of cloud providers. The dynamic sequence can be matched with dynamic pricing. A cloud provider can generate revenue by fulfilling a request for resources from a cloud customer, referred to as request revenue. The request revenue can be maximized, and consequently a provider can get the most out of the resource utilization. Dynamic pricing can be used with an intermediate parameter, such as Bids, between customers and cloud providers. In addition, a ranking method can be utilized based on most instantaneous parameters.

In the following discussion, a general description of the system and its components is provided, followed by a discussion of the operation of the same. With reference to FIG. 1, shown is high level topology of a ranked system in a networked environment 100 according to various embodiments. The networked environment 100 can include a core system 101; one or more cloud providers 102; one or more federated clouds 103; and pathways 104, 105, and 106. The pathways 104, 105, and 106 can be a networked connection. The core system 101 can be embedded within any cloud embodiment or be deployed as an extra system independently. The core system 101 can execute various applications, including for example, a ranked method. The ranked method can include a ranked scheduler. The core system 101 can communicate not only to the cloud providers 102 through a pathway 104, but also to any other types of cloud topologies, such as, for example, to the federated cloud 103 through pathway 105. The core system 101 can directly and indirectly communicate and control the process of a cloud provider 102. As an example, the core system can communicate directly through pathway 104 or indirectly through the federated cloud 103 when there is potential of communication between clouds, such as via a pathway 105.

Figure 2:
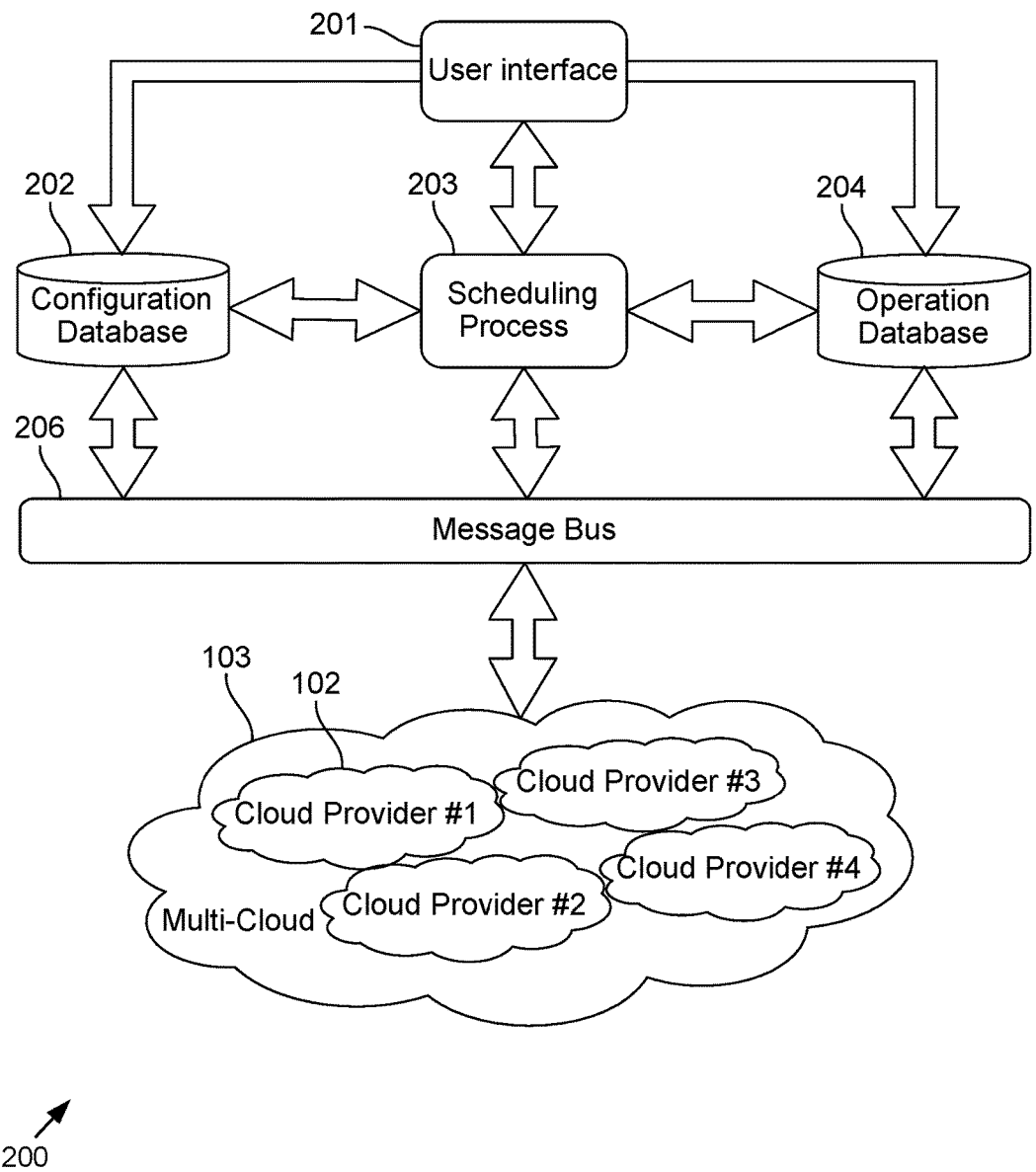
FIG. 2 illustrates is a network architecture for scheduling workload-aware jobs in the networked environment of FIG. 1 according to various embodiments of the present disclosure.

Turning to FIG. 2, shown is a high level architecture of a distributed scheduling system 200 in the networked environment 100 (FIG. 1) according to various embodiments of the present disclosure. The user interface 201 can communicate via an API with a configuration database 202, a scheduling process 203, and an operation database 204. The user interface 201 can share user request specifications with the configuration database 202. The configuration database 202 can receive the cloud providers 102 setting through a message bus 206. The configuration database 202 can provide the inputs for the scheduling process 203. The inputs can include profile information for each of the user requested services, a queue of the resources from the cloud provider 102, and other inputs.

The scheduling process 203 can communicate with the user interface 201 and the multi-cloud 103 to perform various tasks, such as, for example, provisioning resources. Communications between the scheduling process 203 and the multi-cloud 103 can be transmitted and received through the message bus 206. The multi-cloud 103 can include one or more cloud providers 102. The operation database 204 can carry on commands and monitor activities from the users and the cloud providers 102.

Figure 3:
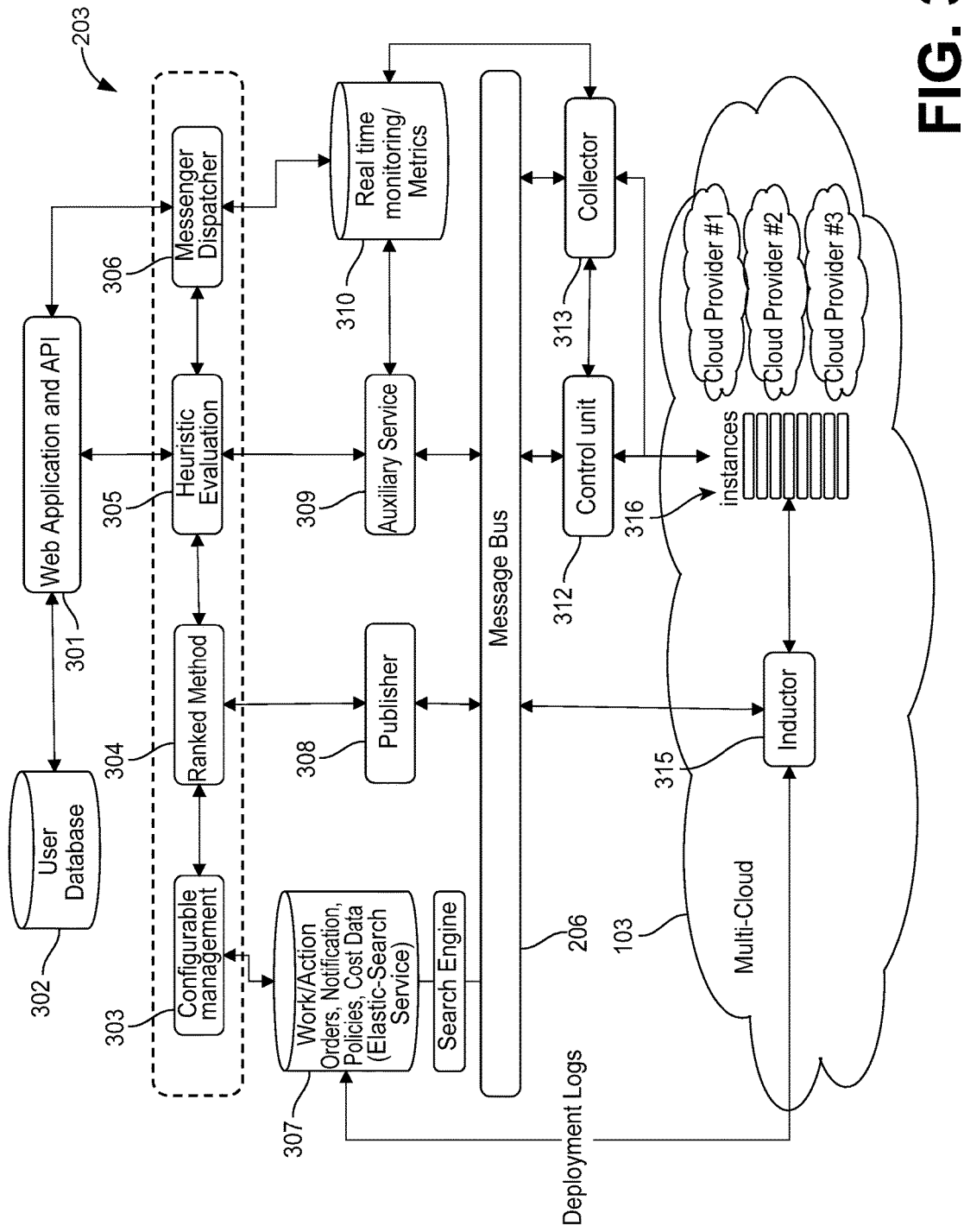
FIG. 3 illustrates a network architecture in the networked environment of FIG. 1 according to various embodiments of the present disclosure.

With reference to FIG. 3, shown is a ranked system architecture 300 in the networked environment 100 of FIG. 1 according to various embodiments of the present disclosure. The web application and API 301 is the gate for managing applications, services, clouds, and other elements. The web application and API 301 can support Rest based API alongside any other types of input which can be performed through user interface 201. The ranked system architecture 300 can include a user database 302, a configurable management 303, a ranked method 304, a heuristic evaluation 305, a message dispatcher 306, an elastic search service 307, a publisher 308, an auxiliary service 309, real time monitoring 310, a message bus 206, a control unit 312, a collector 313, one or more multi-clouds 103, an inductor 315, and instances 316 among other elements.

The user database 302 can be the tenants' manager. The configurable management 303 can manage models, assemblies, environment, and other components. The configurable management 303 can match the demands from the tenants to a user profile. The ranked method 304 can be responsible for creating and deploying scheduling design. The heuristic evaluation 305 can be responsible for comparing the deployed design to the planned design, tenant activity, and tenant updates. The message dispatcher 306 can provide the detail monitoring facilities for user interface 201 with the metrics data. The elastic search service 307 can record all deployments, thread, dataflow, task mapping, assemblies, environments, and other recordable elements. The elastic search service 307 can provide log analytics, real-time application monitoring, and click stream analytics. The publisher 308 can track the ranked method 304 and post the design on the message bus 206.

The auxiliary service 309 can implement policies and cost models. The real time monitoring 310 can monitor real time storage of the metrics data provided by the collector 313. The real time monitoring 310 can be a database having the features including scalability and high availability without compromising performance. Internal communication between the components can be carried by the message bus 206. The control unit 312 can distribute action orders, such as, for example, to the different instances in the multi-cloud 103. The collector 313 can collect metrics from the instances for any event. The multi-cloud 103 can contain the inductor 315 and the instances 316. The instances can be a pool of shared instances provided by cloud providers 102. The inductor 315 can receive, design, and deploy the actions and post the results to the core system 101. The inductor 315 can be responsible for executing steps in implementation, gathering the queue of clouds specifications, making the reaction queue, and reporting the reaction queue to controller.

Figure 4:
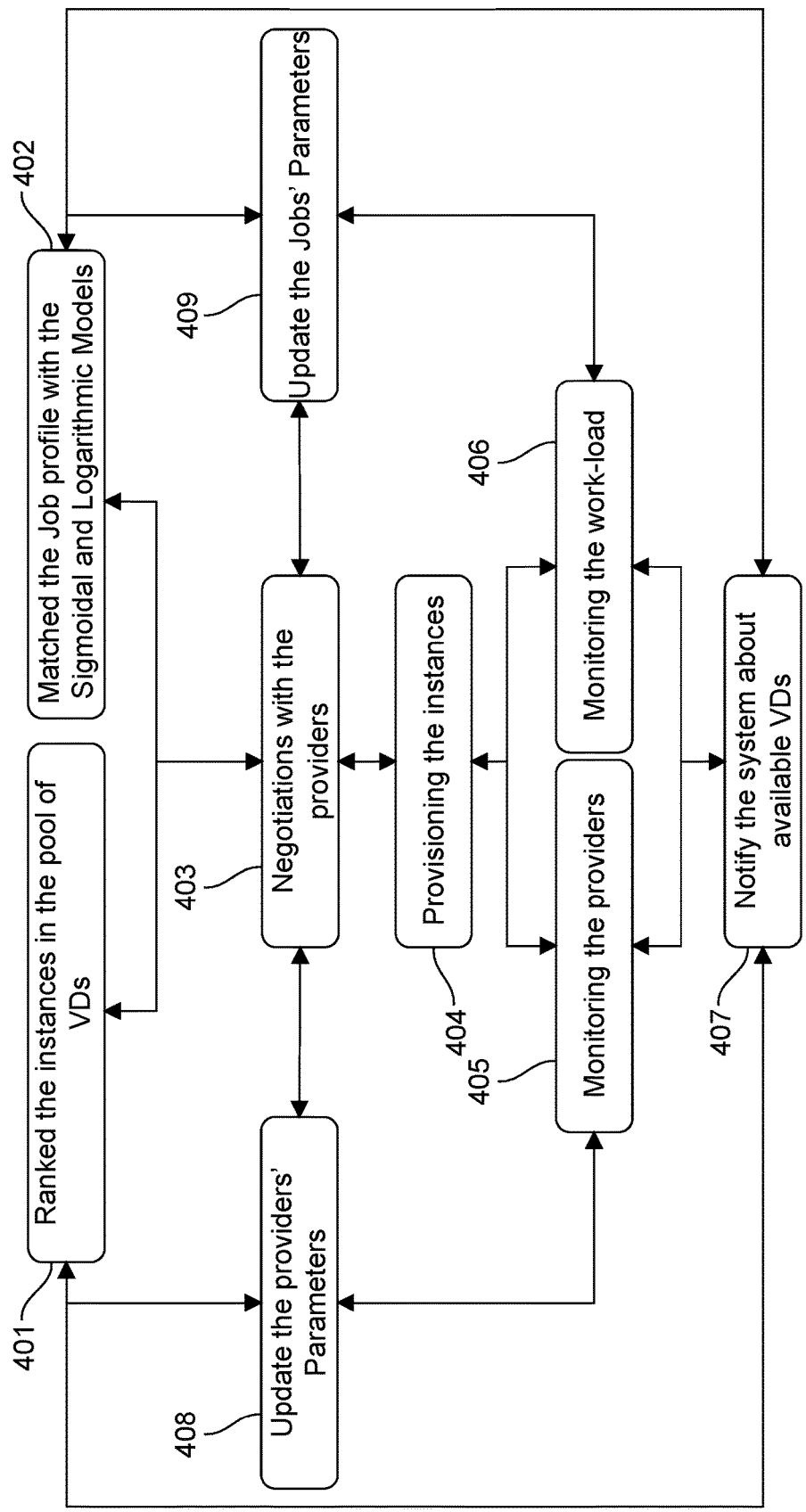
FIG. 4 is a flowchart illustrating one example of functionality implemented for operations in scheduling workload-aware jobs in the networked environment of FIG. 1 according to various embodiments of the present disclosure.

With reference to FIG. 4, shown is a flowchart illustrating one example of functionality implemented for operations in scheduling workload-aware jobs in the networked environment of FIG. 1, according to various embodiments. As an alternative, the flowchart of FIG. 4 can be viewed as depicting an example of elements of a method implemented in the ranked method 304 implemented in the networked environment 100 (FIG. 1), according to one or more embodiments.

In box 401, the ranked method 304 can rank the instances of the providers and proceed to box 403 to process the results. In box 402, the ranked method 304 can match the tenants' jobs to a job profile and proceed to box 403 to process the results. In some embodiments, the ranked method 304 proceeds from box 401 to box 402 and from box 402 to box 403.

In box 403, after the ranked method 304 gets the inputs, the ranked method negotiates with the available instances to determine how to satisfy the requirements of the jobs with respect to the SLA. The ranked method 403 can proceed to box 404 to process the results for implementation. The ranked method can provision the instances in box 404.

In box 405, the ranked method 304 can monitor the cloud providers 102. The ranked method 304 can also monitor various parameters including the work-load in box 406. The ranked method 304 can update parameters on the ranked instances side. The ranked method 304 can also monitor the job activity of the tenants and any activities which may affect the parameters.

In box 408, the ranked method 304 can report and update the provisioning. In box 407, the ranked method 304 can process the results of monitoring and generate a database for the available instances. The database can affect the results of box 401 and 402 on each ranking iteration. As an example, elastic instances can be added to the system.

The ranked method 403 can have the following features, among others, including:

similar instances of different cloud providers 102 can be situated in a same group (which can be referred to as clutch);

each clutch can include different cloud providers 102;

initially top ranked instances can have the upper-most slots and bottom ranked instances have the lowest-most slots;

for customer satisfaction, evaluation of the requested service can be placed in a specific group or sets of groups based on the lowest and highest requested instances, and interpolation and other methods can be used;

before fully occupied resources, top ranked instances can be allocated to the corresponding request;

after fully occupied resources, top ranked instances may not be allocated for a request, but another ranked instance in a same clutch has more opportunity to be allocated to the task—this action can strictly depend on the utility function assigned to the request;

transcendent ranked instances can ameliorate customer satisfactions for the assigned service;

in some embodiments, transcendent ranked instances are not intended to be occupied if an amount of demand increases;

inferior ranked instances keep the request revenue in order to maximize the cloud revenue;

instances in a same clutch can be reshuffled to maximize the resource utilization if there are profits for the corresponding providers; and hedging from clutch to the adjacent clutch can be performed in a case of resource shrinking and can strictly depend on the utility function.

Figure 5:
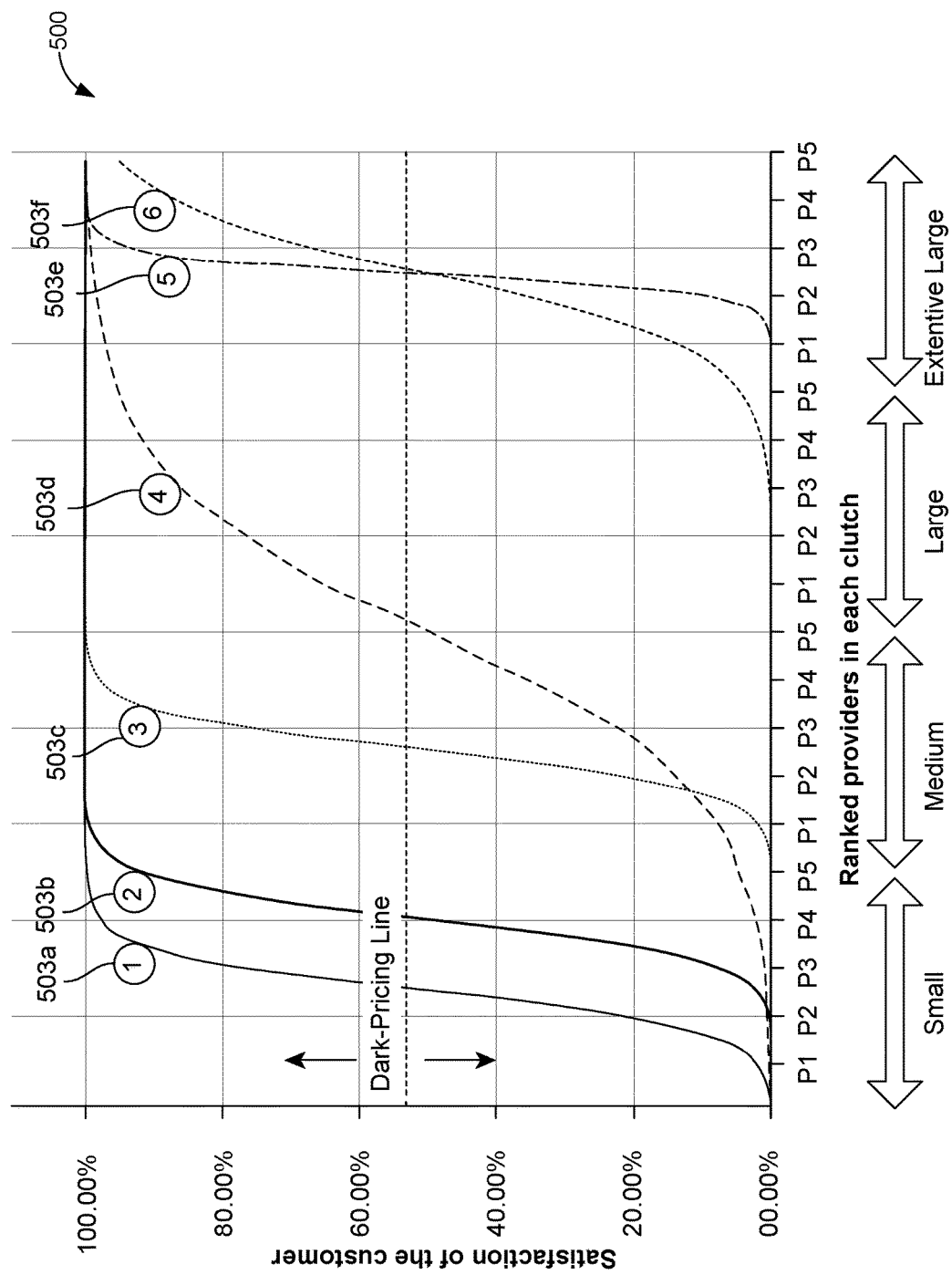
FIG. 5 is a chart illustrating a distribution of classified available instances to categorized services using ranking method functions based on a featured sigmoidal function according to various embodiments of the present disclosure.

Turning to FIG. 5, shown is a chart 500 illustrating a distribution of classified available instances to categorized services using ranking method functions based on a featured sigmoidal function according to various embodiments. FIG. 5 illustrates how the scheduling process 203 can take advantage of the sigmoidal functions. The chart 500 includes four clutches in which five providers make a pool of ranked instances as small, medium, large and extensive large. Six unalike sigmoidal utility functions 503a-f correspond to the six types of customers or services. Utility functions 503a and 503b belong to the small clutch in which a cloud provider 102 number 5 (P5) has the highest priority to serve any request in the clutch. In this clutch, customers who are assigned to utility function 2 rather than 1 can have a greater chance to take the better service based on the chosen ranked parameter.

However, utility function 503a can get services simultaneously from P5 if enough resources are available in the multi-cloud 103. By increasing demands and reducing the number of free instances, the chance of getting services from inferior providers increases.

The ranking method can attempt to provision resources for all of types of the customers. However, by increasing the number of requests for a specific provider or clutch, based on the Service Level Agreement (SLA), three scenarios are likely to occur.

First, pass the customer to the lower-most neighbor provider or lower-ranked provider. A sigmoidal function selected by the customers carries on this scenario automatically.

Second, the customer may lose allocated instances if the customer does not satisfy the provider proposed conditions, such as, for example, raising the price. This scenario can be implemented to control a number of available resources, (V−z), in each processing period.

Finally, the customer can accept the proposed condition, and the allocated instances can remain to serve the customer. Utility function 503c describes the only service in the medium clutch. The utility function 503c can spread over the whole clutch from P1 to P5, so each of the serving cloud providers 102 can provision the customer.

The large clutch only utility function 503d can present services, but the utility function 503d spreads not only in large clutch but also from small clutch to extensive large clutch. Consequently, customers in this utility function can have a potential to get serve in a variety clutches. The customers have a chance to have an experience in extensive large clutch when enough pooled resources are available. Apparently, it is not a case when the multi-cloud 103 has a high amount request. This type of utility function helps to maximize the revenue of the requests by providing motivation, such as paying less for these types of functions. In extensive large clutch, two types of utility functions 503e and 503f are managing the requests revenue and resources of the providers.

In the example embodiment shown in FIG. 5, utility function 503e has the sharpest slop in this simplified properties illustration of the ranking method. This type of utility function 503e can be fixed in a specific provider with two applications: (1) serve a customer by a specific ranked or no ranked properties over a time; and (2) fix the instance of the provider for a service after the customer accepts the dynamic conditions of the provider such as dynamic pricing.

The ranking method can provide flexibility to serve the customers dynamically, by applying some principle conditions in the SLA to match the customer requests and utility functions. Maximizing the profits of the cloud providers 102 can be one of the primary goals of the multi-cloud 103. This goal makes the ranking method able to potentiate the dynamic pricing conditions in the SLA.

With reference to Mathematical Formulation of the Ranked Scheduler, a distributed process of an optimized controller for resource allocation of elastic and inelastic traffic using logarithmic and sigmoidal-like utility functions can be based on a utility proportional policy. The distributed process can include one or more algorithms. The utility proportional policy can be to maximize the requests revenue where the fairness among users is in utility percentage. The utility proportional policy can be to describe the user gratification with the service of the corresponding bid. Furthermore, the distributed process can provide precise information of the available resources and distribute them among the users. The distributed process can be implemented as a part of the cloud service brokerage or as a separate unit in cloud computing architecture of IaaS.

The distributed process can include Sigmoidal and Logarithmic utility functions which have had applications in resource scheduling. The utility functions can be used as gauges for dynamic resource allocation such that requirements defined in an SLA are satisfied. The cloud providers 102 can receive the benefit of using all their available resources and minimizes the operating costs. A virtual data center (vDC) can be considered as the resource unit; however, other resources units can also be considered. A variety kinds of instances can be considered which include different amounts of computation capability, memory, storage, and bandwidth resources.

The vDC allocated by controller to the $k^{th}$ service can be given by $v_k$. The distributed process can have a suitable utility function assigned to the service by using techniques such as interpolation, statistic methods, or other techniques. One objective can be to determine a vDC that the scheduler can allocate to the specific customer. For this optimization problem, strictly concave utility functions can be used that satisfies the following properties:

$U_k(v_k)$ is an increasing function of $v_k$. (1)

$U(0)=0$ and $U(\infty)=1$.
$U_k(v_k)$ is twice continuously differentiable in $v_k$.
$U_k$ is bounded above.

Most utility functions in current networks can be supported in the distributed process: Sigmoidal-like, Strictly concave function, and Strictly convex function.

Sigmoidal Tasks:

Sigmoidal-like tasks can be associated with metadata defining a specific amount of resources which are requested by the service. A characteristic of a requested pay-as-you-go service can be matched to a suitable sigmoidal function. Inelastic tasks can be defined by a sigmoidal function. The sigmoidal function can be expressed as:

$$U_k(v_k) = c_k \left( \frac{1}{1+e^{-a_k(v_k-b_k)}} - d_k \right) \quad (2)$$

to satisfy all the required properties the sigmoidal function is enough to have $$c_k = \frac{1+e^{a_k b_k}}{e^{a_k b_k}} \text{ and } d_k = \frac{1}{1+e^{a_k b_k}} \quad (3)$$

$a_k$ and $b_k$ can be chosen to describe the utility function of the $k^{th}$ user. For example, by choosing a=5 and b=10, a good approximation for a step function can be obtained that explains the fixed usage of the allocated resources, for instance, users with the specific requirement of the resources. A normalized sigmoidal-like utility function with a=0.5 and b=20 is another example for representation of the adaptive real-time application.

Logarithmic Task:

A logarithmic task can be configured to use all resources in a pool of vDCs as much as possible. In a case of temporary real-time services, the same as spot instances, normalized logarithmic utility function describes the good description. A minimum number of resources are needed for a logarithmic utility function, and the logarithmic utility function can occupy more resources in a case of availability. A mathematical expression of a logarithmic utility function can be expressed as:

$$U_k(v_k) = \frac{\log(1+m_k v_k)}{\log(1+m_k v_{max})} \quad (4)$$

where $v_{max}$ is the point in which the task occupies all available resources. All available resources can correspond to an amount of resources mentioned in an SLA. For example, if the user's specific job is fully satisfied by 30 vDCs, $v_{max}$ should be set to 30. Any allocated vDCs less than 30 leads to the less satisfaction, but it does not mean the user's specific job suffers a loss of performance, since the performance is based on the required resources for doing the specific job.

A user can utilize all 30 vDCs. However, if a user is not fully using allocated resources, which can be confirmed by monitoring of the resources and through the negotiation process, then the user can share the resources via a management process. In such a case, the customer and the provider get the advantage simultaneously. In (4), $m_k$ is the rate of increasing utility percentage with the allocated rate $v_k$. Both function types are satisfied with same constraints as in (1).

Figure 6:
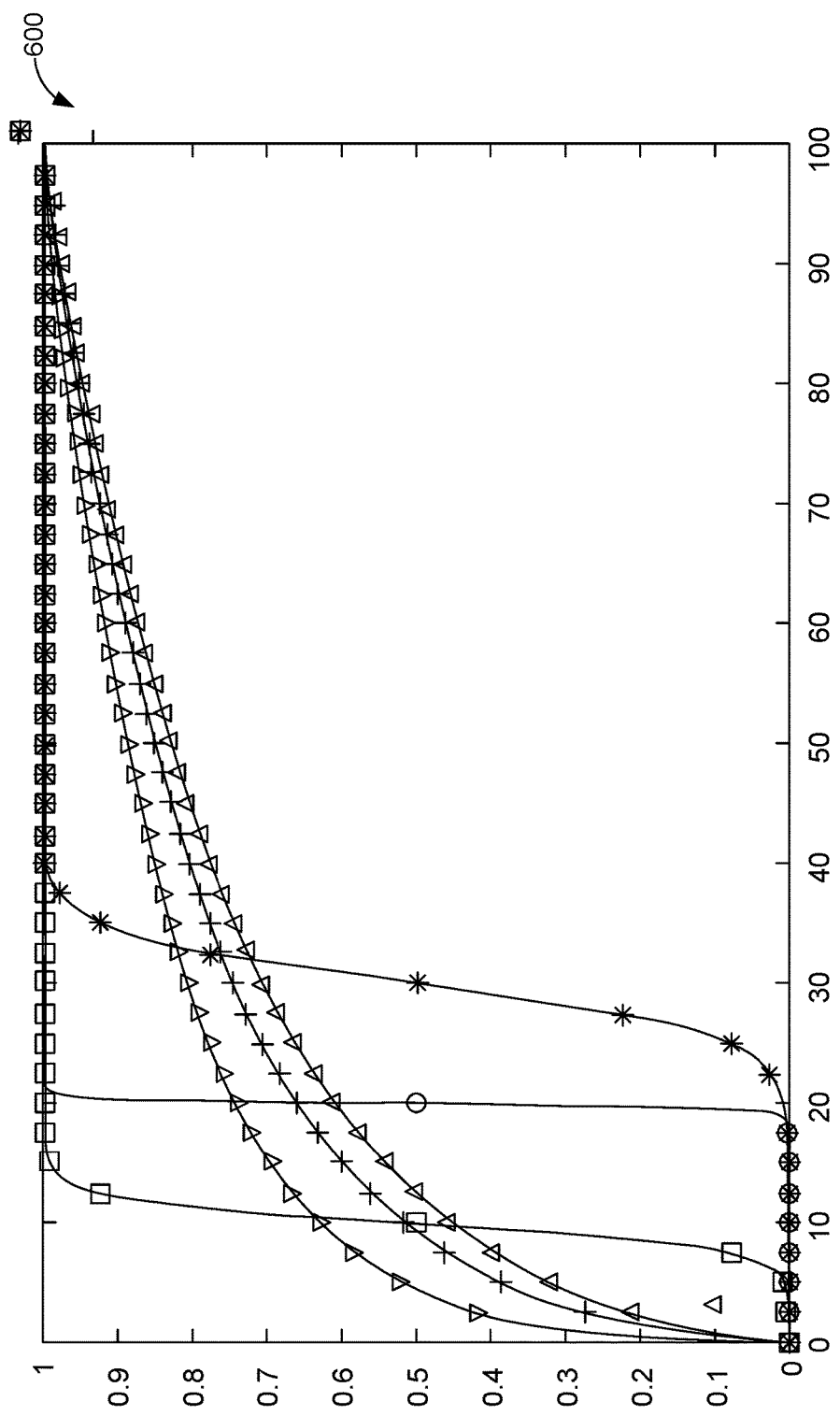
FIG. 6 is a chart illustrating examples of sigmoidal-like utility functions and logarithmic utility functions according to various embodiments of the present disclosure.

With reference to FIG. 6, shown are normalized sigmoidal-like and logarithmic examples of utility functions according to various embodiments of the present disclosure. The chart 600 depicts the properties of the functions referring to the featured variables. To maximize the resource allocation based on the utility function, the objective function can be defined as follows:

$$\max_v \prod_{k=1}^{M} U_i(v_i) \quad (5)$$

$$\text{Subject to } \sum_{k=1}^{M} v_k \le R$$

$$v_k \ge 0 \quad i=1, 2, \ldots, M$$

where $v=\{v_1, v_2 v_3, \ldots, v_M\} v=\{v_1, v_2 v_3, \ldots, v_M\}$ and M is the number of the requests. This formulation can ensure non-zero resource provisioning for customers while guaranteeing minimum predefined constraints are met. Furthermore, using sigmoidal function leads to more resource being allocated for a corresponding task when a specific amount of resources is required.

Proportional resources can be allocated based on the utility functions. A global optimal solution for (5) can be proven. Since (5) is a convex optimization problem, a unique trace-back global optimal solution can exist for the problem. Objective function of $$\operatorname*{argmax}_v \prod_{k=1}^{M} U_k(v_k)$$

is equivalent to $$\operatorname*{argmax}_v \sum_{k=1}^{M} \log(U_k(v_k)),$$

and for both applied functions, Sigmoidal $$\frac{d}{dv_i} \log U_i(v_k) > 0$$

and Logarithmic $$\frac{d}{dv_i}\log U_i(v_k) > 0 \text{ and } \frac{d^2}{dv_i^2}\log U_i(v_k) < 0.$$

Both functions can be strictly concave natural logarithms. Therefore, the optimization problem can be a convex optimization problem, and a unique trace-back global optimal solution exists.

In terms of the Dynamic Distributed Resources Approach, to make the optimization problem as the negotiated process for provision resources dynamically based on demand and supply, a dual problem can be used to distribute the optimization problem among the stakeholders of the multi-cloud 103. In a communication network, it can be performed by defining the Lagrangian function as:

$$L(v, p) = \sum_{k=1}^{M} \log(U_k(v_k)) - p\left(\sum_{k=1}^{M} v_k + z - R\right) \quad (6)$$

$$= \sum_{k=1}^{M} (\log(U_i(r_i)) - pv_k) + p(R - z)$$

$$= \sum_{k=1}^{M} L_k(v_k, p) + p(R - z)$$

where z≥0 is the slack variable (we discuss in more detail about the slack variable later), and p is Lagrange multiplier or the dark price which is the intermediate parameter in negotiation between the multi-cloud 103 and customers. To match the ranked instances by ranking method, the dark price can be weighted by the ranked order, which is also called bid. By assigning a set of utility functions, not only spot instances but also other tasks can be evaluated simultaneously to make the decision for resources provisioning in the multi-cloud 103.

Satisfying the simultaneous scheduling for multi types of tasks, the $k^{th}$ bid for the instance can be given by $w_k = pr_k$. Subsequently, the dual problem objective function can be written as: $D(p) = \max_v L(v,p)$, and the dual problem is given by:

$$\min_p D(p) \quad (7)$$

Subject to $p \geq 0$

To find the optimal answer, a derivation of the new optimization problem leads to the formulation for dark price by using $\sum_{k=1}^{M} w_k = p \sum_{k=1}^{M} r_k$ and solving the equation for p:

$$\frac{\partial D(p)}{\partial p} = R - \sum_{k=1}^{M} v_k - z = 0 \quad (8)$$

as a result:

$$p = \frac{\sum_{i=1}^{M} w_i}{R - z}. \quad (9)$$

p The equation (9) entails critical information to optimize the problem for p: The equation includes a summation of the bids (from all requests) and available instances (all the active resources). Both the bids and instances can be available in the centralized node. The bids and instances can be monitored. The bids can be received during a negotiation process.

Because the L(v,p) is separable in v, we can rewrite the equation as:

$$\max_v \sum_{k=1}^{M} (\log(U_k(r_k)) - pv_k) = \sum_{k=1}^{M} \max_{r_k} (\log(U_k(r_k)) - pv_k), \quad (10)$$

which implies the optimization problem can be solved for each utility function separately:

$$\max_{v_k} (\log(U_k(v_k)) - pv_k) \quad (11)$$

Subject to $p \geq 0$ and $v_k \geq 0$ $i = 1, 2, \ldots, M$

The equations in the dual problem, such as equation (7) and equation (11), can distribute the optimization problem into two parts. The dual problem can include solving for a dark price. Determining the dark price can require supply and demand information. The dual problem can be solved with respect to the multi-cloud 103. Between these two optimization problems, a dark price can be an intermediate parameter to moderate the criteria for both sides. An iterative process can be established to draw out the settled down point in which stakeholders can get a mutual advantage. This iterative process can be the chosen approach of the algorithm. The mutual proliferation can lead to the maximization of the request revenue and utilization of the pooled vDCs in environment of the multi-cloud 103.

The Dynamic Distributed Ranked Scheduler can have multiple inputs. In one embodiment, the ranked scheduler has two inputs: the ranked instances in clutches and a model of the jobs profiles by the sigmoidal or logarithmic functions based on an SLA. The model of the jobs can make the ranked functions.

Putting together all the described aspects of the proposed algorithm can be projected based on the two mutually joint algorithms shown in equation (1) feeding into equation (2).

---

Algorithm 1 Back ($k^{th}$ Utility Function)

Initiate its bid as $w_k(1)$ to Feed
loop
    Received shadow price p(n) from the Feed
    if STOP from Feed then Calculate allocated rate $v_n^{opt} = \frac{w_k(n)}{p(n)}$ STOP
    else Solve $v_k(n) = \max_{v_k}(\log(U_k(v_k)) - pv_k)$ Send new bid $w_k(n) = p(n)r_k(n)$ to Feed-Algorithm
    end if
end loop Algorithm 2 Feed

```
loop
    input V − z and scale the functions by (V − z)⁻¹
    if kᵗʰ utility function is the active
    Receive bids wₖ(n) from Back-Algorithm {Let wₖ(0) =
0 ∀ᵢ}
    if |wₖ(n) − wₖ(n − 1)| < δ ∀ₖ then
```

$$\text{Allocate rates, } v_k^{opt} = \frac{w_k(n)}{p(n)} \text{ to } k^{th} \text{ Utility Function}$$

```
    STOP
    else
        Based on the specified group for pₖ:
```

$$\text{Calculate } p(n) = \frac{\Sigma_{k=1}^M w_k(n)}{V - z}$$

```
        Send new shadow price based on the users category
    end if
end loop
```

Dark Price can be considered as the iterative parameter between the back-algorithm, which is the customer's basis for negotiation, and a feed-algorithm, which is the multi-cloud 103 basis for negotiation. The feedback process can settle down in a profitable point for customers and providers in the pool of vDCs. Each active task can send the initial bid to the broker. The broker can make a decision based on the difference of two consequent bids per task with the pre-specified gage as δ. If the absolute difference becomes greater than δ, the broker can specify the new shadow price based on the utility function type. Each user can receive the shadow price and solve its own optimization problem $v_{k(n)} = \max_{v_k}(\log(U_k(v_k)) - pv_k)$ for $v_k$ which can be used to calculate the new bid $w_k(n) = p(n)r_k(n)$. The broker can collect all the bids sequentially, and the process can be repeated until $|w_k(n) - w_k(n-1)|$ gets less than the pre-specified threshold δ. There are modifications which can be applied in the algorithm to match them with the ranked method. For example, the scaling factor as (V−z) can be used to make the algorithm into applicable process in the ranked method.

Figure 7:
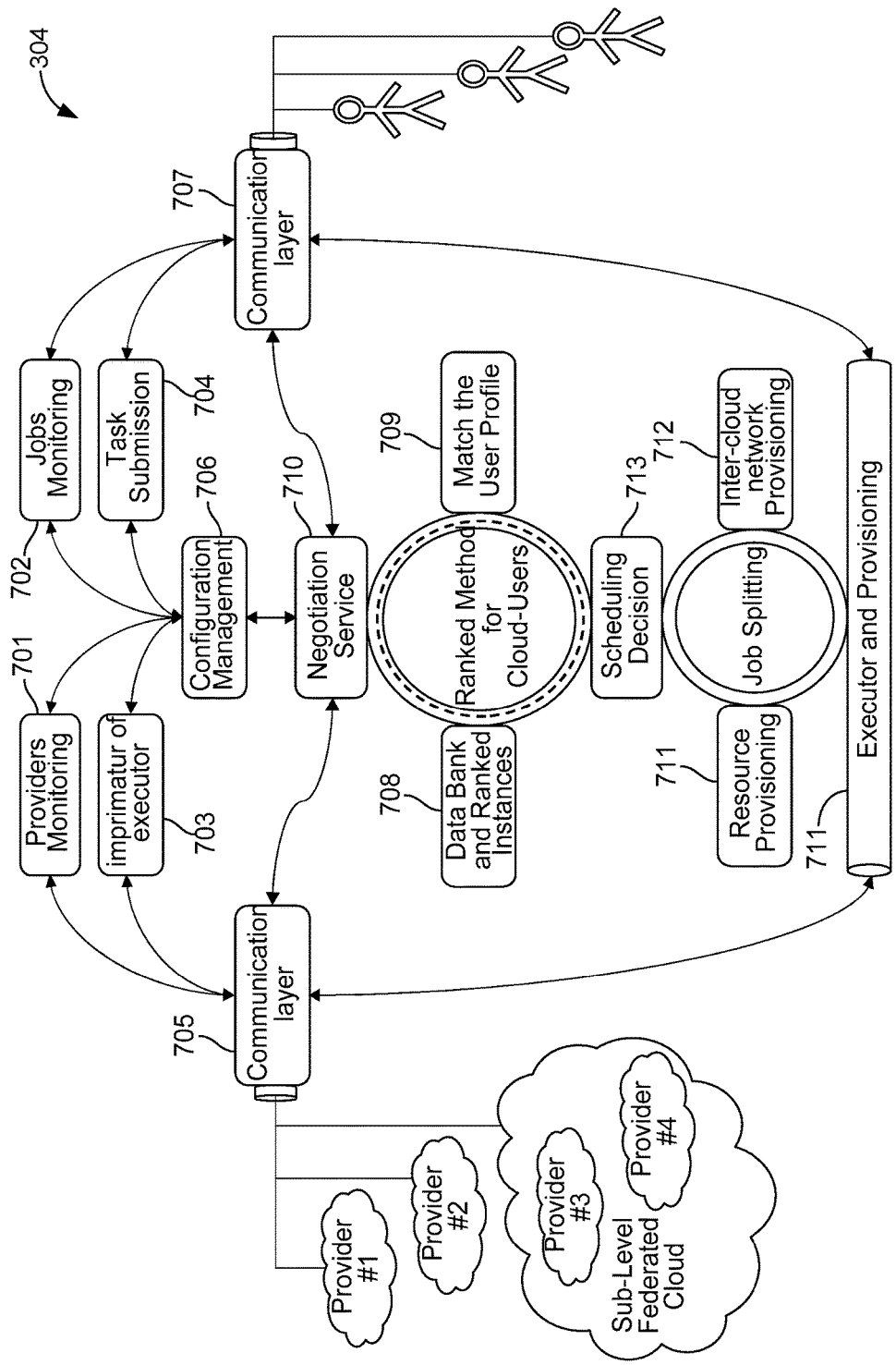
FIG. 7 is the schematic diagram illustrating an example of distributing the algorithm among users and cloud providers according to various embodiments of the present disclosure.

With reference to FIG. 7, shown is the graphical illustration of the ranked method 304. A queue of requests can be guided to the system through the communication layer 707 and into the task submission 704. On the other side, the cloud providers 102 share the properties and specifications of their instances through a communication layer 705 and into the imprimatur of executor 703. The configuration management 706 can manage the configuration of the system using the managed datasets of tenants' profile and cloud instances. The negotiation service 710 can receive the data sets and manage the negotiation process between the communication layers 705 and 707, and the data bank and ranked instances 708. The data bank and ranked instances 708 can implement the ranked instances.

The ranked instances can be updated within a specific period of time, such as, for example, a predefined period of time. After finding the optimal order of clutches and matching the tenants' profile, the scheduling decision 713 can persistently update the provisioning process 711 and job splitting among resources. In addition, a job can be split among instances on the multi clouds by an inter-cloud network provisioning 712. The results can be deployed to the extractor and provisioning 711 for execution. Providers monitoring 701 and jobs monitoring 702 can include iteratively monitoring the ongoing condition and updating the configuration management 706 for further actions.

Figure 8:
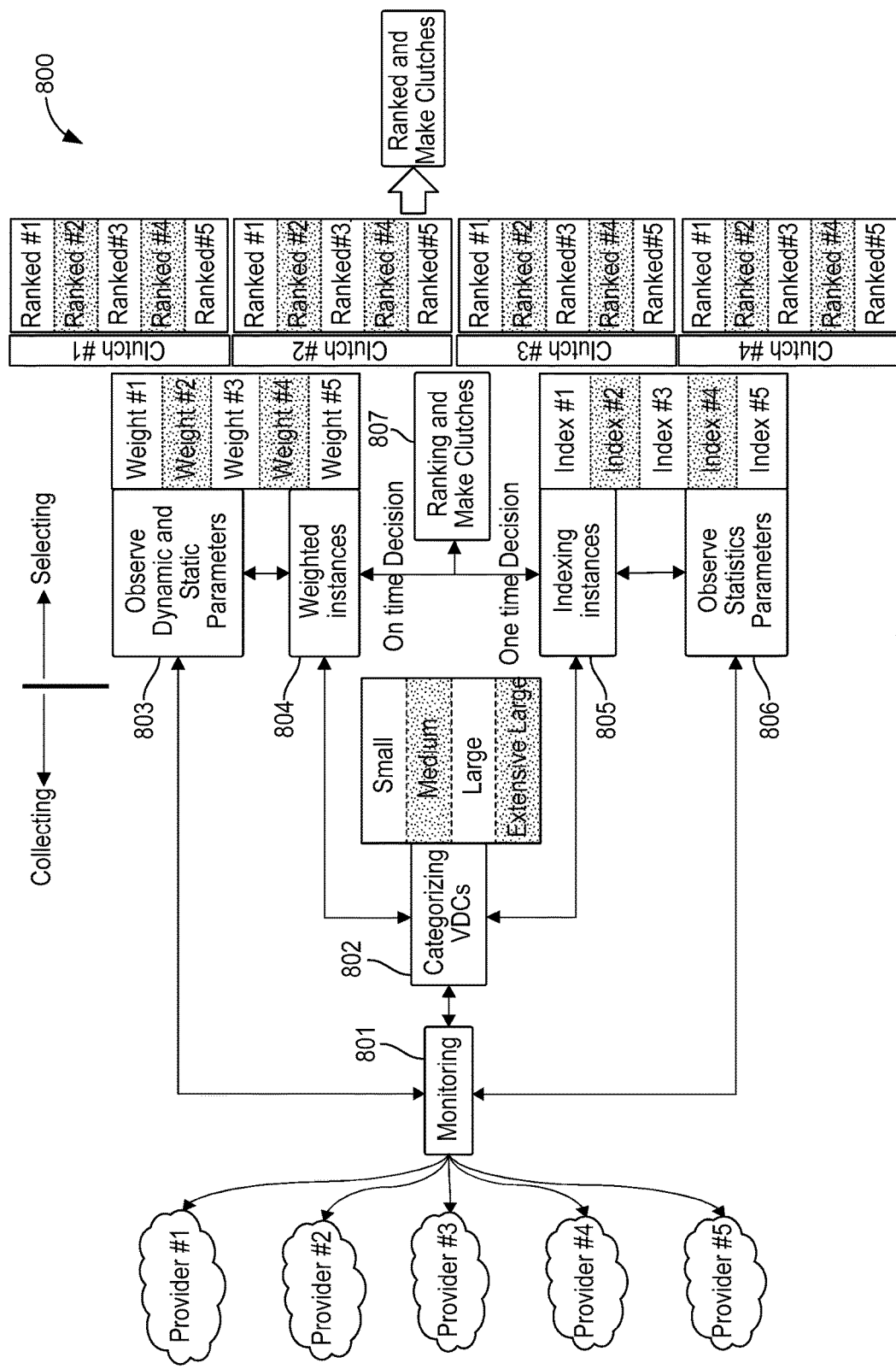
FIG. 8 is a chart illustrating a process for ranking instances of the cloud providers to form clutches using a ranked method according to various embodiments of the present disclosure.

Turning to FIG. 8, shown is a chart 800 illustrating a process of forming clutches according to the ranked method. The monitoring 801 can involve delivering the specifications of the cloud providers 102 to the categorizing VDCs 802 to categorize the instances based on VDs properties. For example, the VDs properties can include computational power, memory size, hard drive capacity, and other properties. The process of monitoring information at monitoring 801 can be referred to as collecting information.

After the collecting information, the selection process can be established. The weighted instances 804 can be referred to as a weighting phase. The observe element 803 can observe dynamic and static parameters and inform the weighted instances 804 of changes. The dynamic parameters can include any variables in a model that varies, such as, for example, a measurement unit, occupation percentage of a cloud provider 102, networking parameters, elastic resources, and other parameters. The static parameter can include variables that do not change within the model, such as, for example, the service type, security, Quality of Service (QoS), pricing unit, instances size, operating system, pricing sensitivity to regions, subcontractors, and other parameters.

Indexing instances 805 represent an indexing step. The indexing instances 805 can be based on statistics, predictions, and other factors. The prediction of variation can be based on data from both the cloud provider 102 and the user. The indexing instances 805 can use the activity and history of the cloud providers 102 and customers to predict a workload. Machine learning algorithms and other methods can be used in the indexing instances 805 to predict the workload. The weighted instances 804 can monitor the system continuously. The indexing instance 805 can occur a single time per specific period of time. The ranking and make clutches 807 can make the ranked instances in a queue using the result of weighting and indexing phases.

The ranking method can be applied to the variety sets of utility functions. Convergence of the proposed algorithm can be verified by a simulation. In one simulation, to show the generality of the algorithm, instances of the providers can be ranked from 1 to 100 and can include four clutches with the same size. Each count of the instances can be interpreted with specific parameters. In a first example simulation, six utility functions corresponding to the sigmoidal functions in FIG. 5. can be simulated. Through classification of the instances, the same instances can be put into the same clutch. To more clearly illustrate the process, the example can use computing power as a gauge to distinguish between the instances, although other factors can be used as a gauge, such as, for example, computing power, memory, disk space, networking bandwidth, and other factors. The classification methods can be used to weight the gauges.

In the first simulation, the computing power can be used as a weighted parameter to provide the gauge. The necessitated manipulation to the algorithm can be related to the (V−z) as the maximum available resources. The pool of resources in vDC of the multi-cloud 103 can be the other explanation of the (V−z) manipulation. In the algorithm, V is the maximum number of resources, and z is the reserved resources for the specific tasks or customers. Since by increasing (V−z) just the scaling of the functions are varied, the convergence of the optimization problem is not denied. The manipulation which is used for this simulation is as follows:

$$(V-z) = \Sigma_{i=1}^I \Sigma_n^N C_{i,n} P_i^n \qquad (12)$$

wherein I is the maximum number of providers, N is the maximum number of the clutches, $C_{i,n}$ is the coefficient for the ith provider in the nth clutch, and $P_i''$ is the corresponding provider advantageous over other providers in the lucrative specification terms. The scaling factor is $(V-z)^{-1}$ for all of the functions. In the first simulation, $P_i''=1$ indicates the similarity in the performance of the providers and $C_{i,n}=b_{i,n}$.

Figure 9:
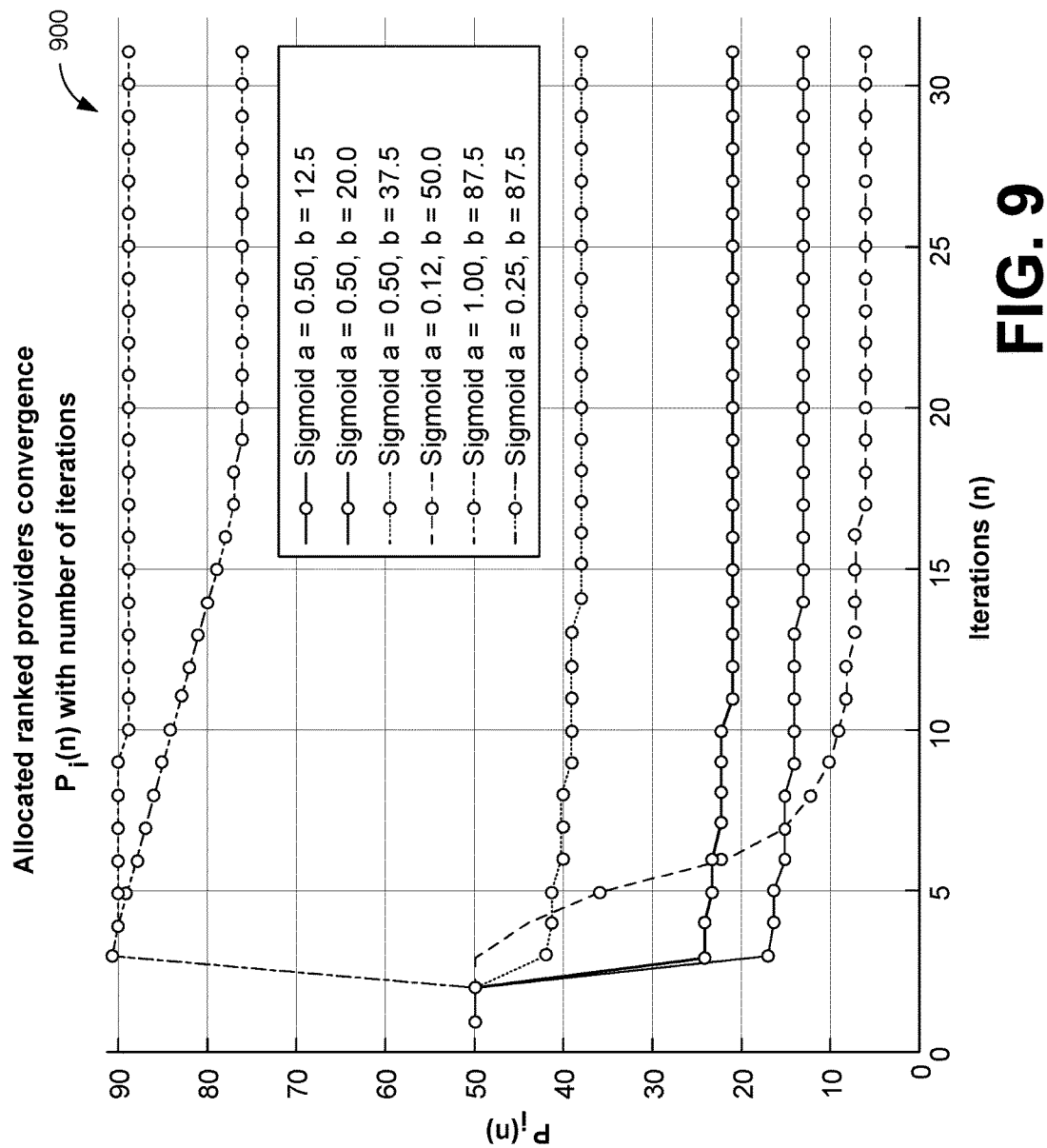
FIG. 9 is a graph illustrating the convergence of algorithms over multiple iterations according to various embodiments of the present disclosure.

With reference to FIG. 9, shown is a graph 900 that describes the convergence of the algorithms based on a weighting of the ranked clutches in the x axis, and the scaling of all of the functions is based on the available calculated resources according to various embodiments of the present disclosure. $(V-z)=240$ is considered with the iterations n=20. The rates of different functions with the number of iteration is illustrated in the chart 900. In the example shown in chart 900, after giving enough iterations, the algorithm settles down for the sigmoidal functions as 13, 21, 38, 6, 89, and 76, correspondingly. This simulation shows that, for the 4th sigmoidal function, the allocated instances are placed in the lowest clutch. The algorithm can provides the lowest priority for the fourth function since the fourth function (with a=0.12) is spread throughout the operating boundaries.

Figure 10:
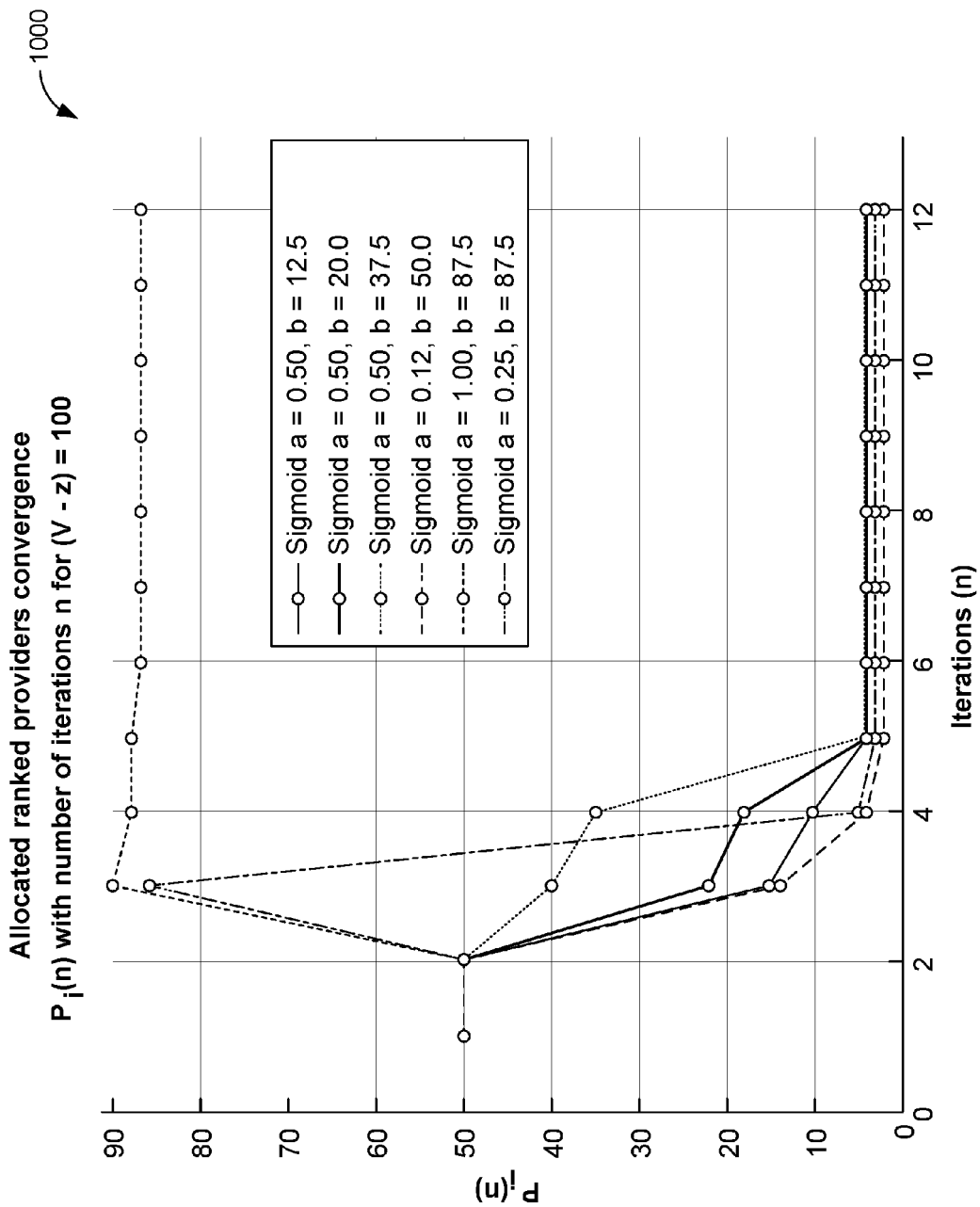
FIG. 10 is a graph illustrating how the ranked method provisions on demand requests, including the classification of the services, while the scaling factor increase according to various embodiments of the present disclosure.

With reference to FIG. 10, shown is a graph 1000 illustrating a second example case according to various embodiments of the present disclosure. In the second example case, the available resources are decreases to $(V-z)=100$. From the results in graph 1000 with reference to FIG. 8, it is shown that the sigmoidal function number 5 is satisfied with the appropriate instances that are matched with its request. However, sigmoidal function number 6 is not confined in its primary clutch and is downgraded to the small clutch. The reason for this, is that the sigmoidal function number 6 has the a value as 0.25, which spreads the function outside of its primary clutch despite of the sigmoidal function number 5 with the a value as 1, which strictly confines the sigmoidal function in its primary clutch. The same reason can be applied for function number 4. Since function number 4 spreads widely throughout the operating boundaries, function number 4 gets even less ranked instance than function number 1, 2, or 3. Finally, sigmoidal functions 1 and 2 get the same instances, which means the low ranked clutch has the opportunity to serve more customers. This means that when the requests exceed the available resources, petitions for the low ranked clutches rise dramatically.

In the multi-cloud environment, competition between the providers arises to serve a greater number of customers by offering lower-sized instances. When there are enough available resources, the algorithm provides the customers with the highest performance resources based on their desired utility functions. However, when requests are getting higher than the available resources based on the customers chosen model, customers with bounded utility functions maintain their primary resources with a small variation, but the allocated resources for other types of functions can vary to satisfy each specific model chosen by the customers.

Figure 11:
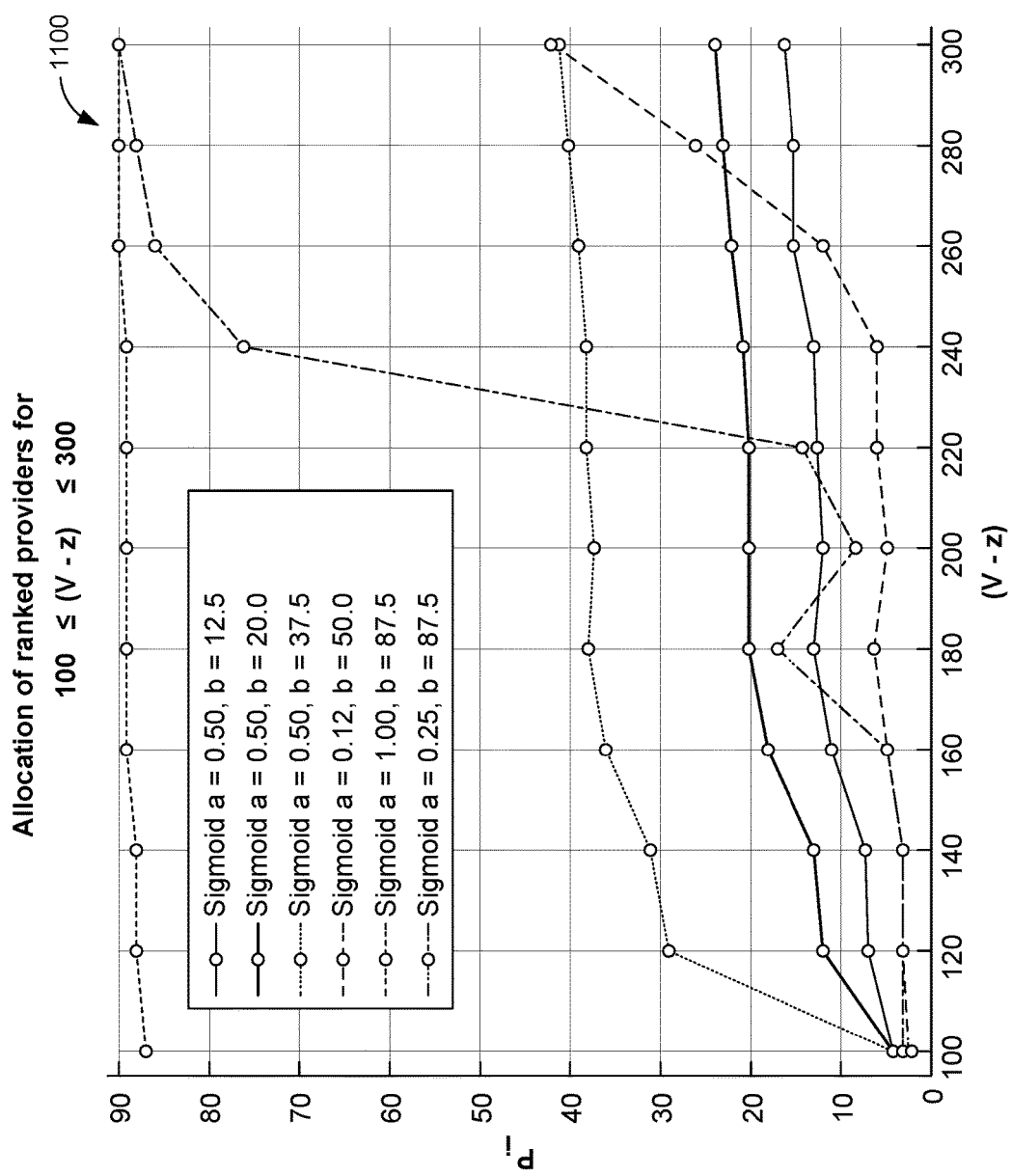
FIG. 11 is a graph illustrating the steady state rate of different sigmoidal functions with different (V–z) according to various embodiments of the present disclosure.

With reference to FIG. 11, shown is a graph 1100 illustrating the steady state rate of different sigmoidal functions with different $(V-z)$ according to various embodiments of the present disclosure. As mentioned before, the monitoring system can control the situation in parallel with the brokering strategies and decide the final decision. At utility function numbers 4 and 6, the requested resources have not been satisfied until the rest of the functions reach their corresponding requested resources.

Implementation of Spot Instances with the Logarithmic Function.

Figure 12:
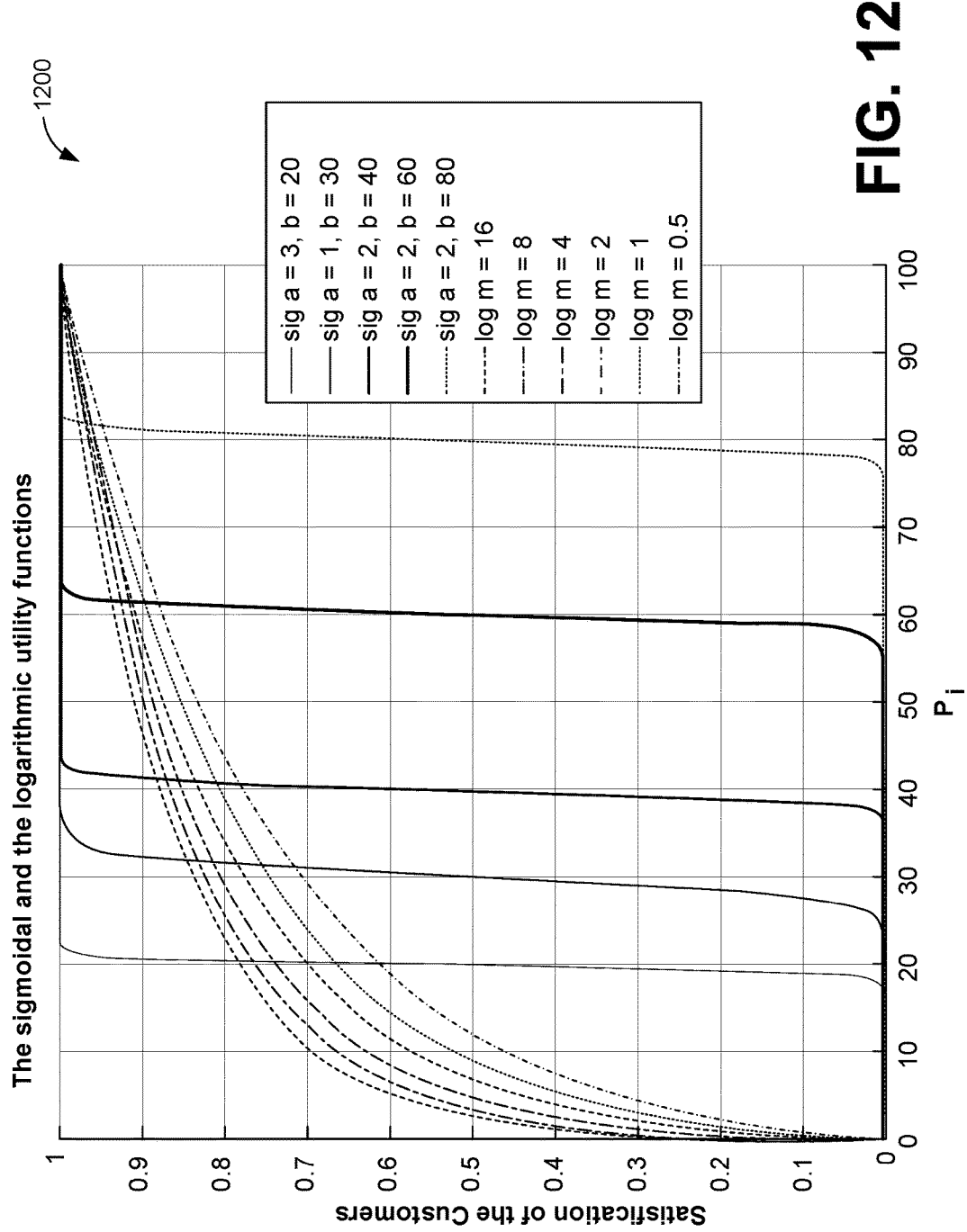
FIG. 12 is graph illustrating satisfaction of customers using examples of sigmoidal functions and logarithmic functions according to various embodiments of the present disclosure.

Spot instances can be implemented with logarithmic functions in the ranked System. The distributed process can have an interesting application in a pricing model for spot instances to control the resource allocation. Spot instances can follow a method that imposes dynamic price based on supply and demand. Since maximizing the revenue of requests is one of the federated cloud aims, a dynamic resource allocation can be simulated. With reference to FIG. 12, shown is a graph 1200 illustrating characteristics of sigmoidal and logarithmic functions according to various embodiments of the present disclosure.

Figure 13:
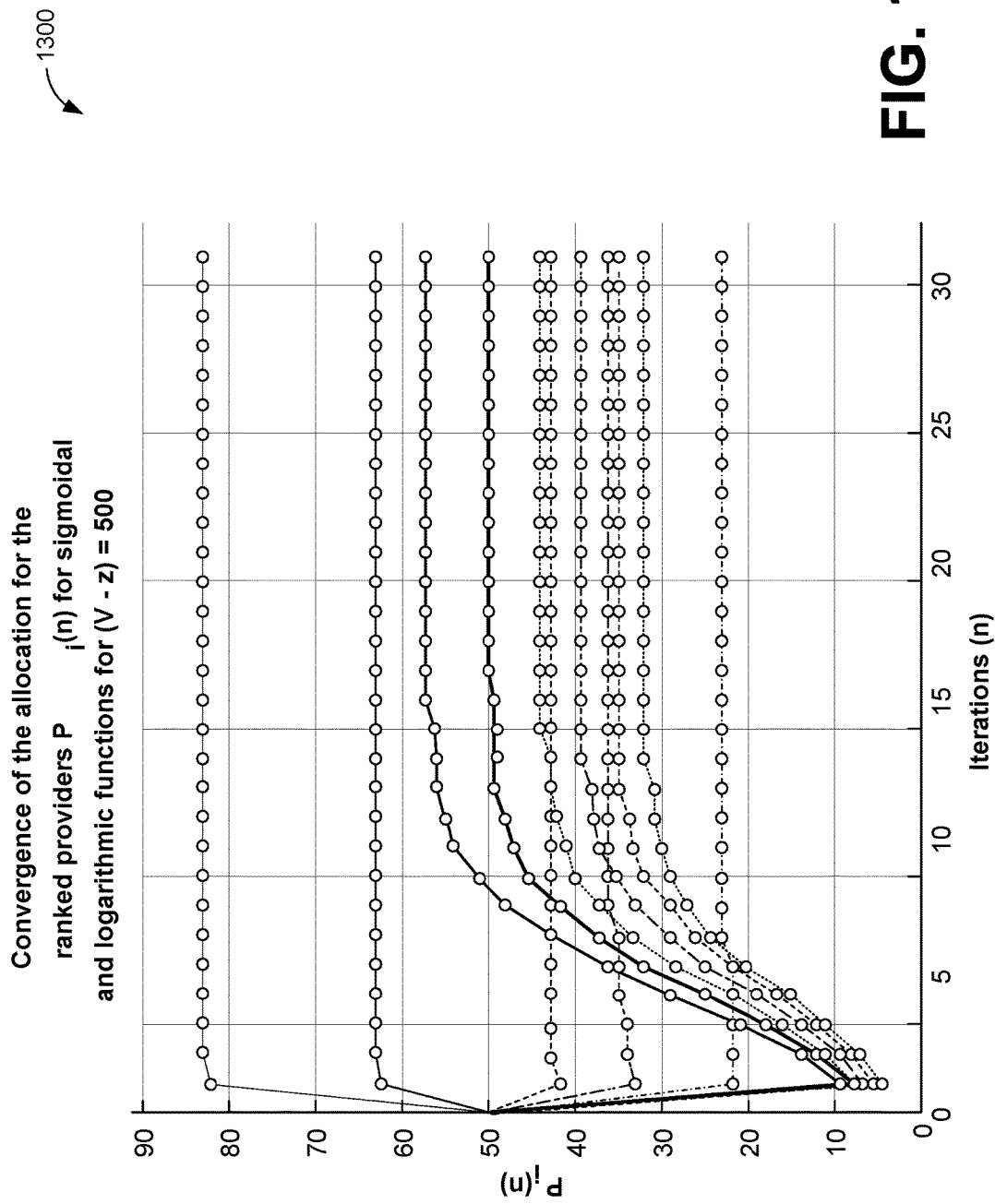
FIG. 13 is a graph illustrating an example of how provisioning of the vDC for elastic tasks can be carried on alongside of the sigmoidal functions by the workload-aware jobs according to various embodiments of the present disclosure.

Turning to FIG. 13, shown is a graph 1300 illustrating an example of how provisioning of the vDC for elastic tasks can be carried on alongside of the sigmoidal functions by the Workload-Aware Jobs according to various embodiments of the present disclosure. The distributed process can give the sigmoidal functions higher priority than the logarithmic function. This is because the distributed process starts giving the resources to the logarithmic functions after the steady state rate of all the sigmoidal functions exceed their corresponding inflection points.

Furthermore, the majority of resources are allocated to the tasks with sigmoidal functions. To illustrate the application of logarithmic functions for spot instances, FIG. 14 shows a graph 1400 that describes the characteristic of the distribution process. The allocation of resources for logarithmic functions have been carried out when the available resources are more than the summation of the inflection points. This feature of the distribution process can be used as the dynamic model for the spot instances. In a case of the available provider with this particular feature, the instances can be provisioned to the customer of the spot instances. When a request for permanent use of the resource is received on the other specific conditions, the spot can return back to the system as an available resource.

The ranking method can be used to support elastic and inelastic services in the heterogeneous environment of the federated cloud. By using sigmoidal functions, the distributed algorithm dynamic provisioning of the resources can be carried on in the ranking method discussed herein. To maximize the revenue derived from usage in a pool of resources, the combination of logarithmic and sigmoidal functions can be used to support the spot instances for the elastic tasks while guaranteed the sigmoidal functions always have the priority, which means the distribution process can support the elastic and inelastic applications simultaneously. The convergence of the distribution process can be simulated for a variety of sets of the sigmoidal and logarithmic functions.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
   a plurality of machine instances individually corresponding to a respective amount of available resources;
   a core system comprising at least one computing device, the core system configured to at least:

receive at least one task from a user, the at least one task comprising a job profile and a logarithmic task configured to use all of the available resources in a pool of the plurality of machine instances, wherein the logarithmic task corresponds to a logarithmic utility function represented by:

$$U_k(v_k) = \frac{\log(1 + m_k v_k)}{\log(1 + m_k v_{max})},$$

where $v_{max}$ is a point where the logarithmic task uses all of the available resources, $v_k$ represents the virtual data center allocated by the controller to the $k^{th}$ service, and $m_k$ is the rate of increasing utility percentage with the allocated rate $v_k$;

generate a plurality of clutches, each of the plurality of clutches including at least two instances from the plurality of machine instances;

determine a rank for the plurality of machine instances based at least in part on a respective clutch of the plurality of clutches for each of the plurality of machine instances and the respective amount of available resources for each of the plurality of machine instances;

determine an identified machine instance of the plurality of machine instances based at least in part on the rank; and provision the identified machine instance to perform the at least one task.

2. The system of claim 1, wherein subsets of the plurality of machine instances individually correspond to a plurality of cloud providers.

3. The system of claim 2, wherein the core system is further configured to at least monitor the plurality of cloud providers, and update a parameter associated with one of the plurality of cloud providers.

4. The system of claim 1, wherein the core system is further configured to at least monitor a work-load associated with the at least one task.

5. The system of claim 4, wherein the core system is further configured to at least update a parameter in the job profile based at least in part on monitoring the work-load.

6. The system of claim 1, wherein the job profile comprises at least one sigmoidal model.

7. The system of claim 1, wherein the job profile comprises at least one logarithmic model.

8. The system of claim 1, wherein a subset of the plurality of machine instances comprises a multi-cloud.

9. The system of claim 1, wherein the identified machine instance is determined based at least in part on whether the identified machine instance can perform the at least one task while satisfying requirements of a service level agreement (SLA).

10. The system of claim 1, wherein the at least one task further comprises a sigmoidal-like task associated with metadata defining an amount of resources requested for the task.

11. A method comprising:
observing at least one dynamic parameter and at least one static parameter;
generating weights for a plurality of machine instances based in part on the at least one dynamic parameter and the at least one static parameter;
generating a ranking the plurality of machine instances and a plurality of clutches based at least in part on the weights;
determining an identified machine instance of the plurality of machine instances based at least in part on the ranking and the plurality of clutches; and
provisioning the identified machine instance to perform at least one task, wherein the at least one task comprises a logarithmic task configured to use all available resources in a pool of the plurality of machine instances, wherein the logarithmic task corresponds to a logarithmic utility function represented by:

$$U_k(v_k) = \frac{\log(1 + m_k v_k)}{\log(1 + m_k v_{max})},$$

where $v_{max}$ is a point where the logarithmic task uses all available resources, $v_k$ represents the virtual data center allocated by the controller to the $k^{th}$ service, and $m_k$ is the rate of increasing utility percentage with the allocated rate $v_k$.

12. The method of claim 11, further comprising receiving a request to perform the at least one task from a user.

13. The method of claim 11, further comprising determining whether the identified machine instance can perform the at least one task while satisfying a plurality of constraints indicated in a service level agreement (SLA).

14. The method of claim 13, wherein determining whether the identified machine instance can perform the at least one task while satisfying the plurality of constraints is based at least in part on a sigmoidal utility function and a logarithmic utility function.

15. The method of claim 11, wherein the at least one task comprises a sigmoidal-like task associated with metadata defining an amount of resources requested for the task.

16. The method of claim 11, wherein the logarithmic task is further configured to require a minimum quantity of resources.

17. The method of claim 11, further comprising determining a dark price for use of the identified machine instance based at least in part on a dual problem.

18. The method of claim 17, generating a bid by weighing the dark price by the ranking of the plurality of machine instances.

19. A system, comprising:
a computing device comprising a processor and a memory; and
machine-readable instructions stored in the memory that, when executed by the processor, cause the computing device to at least:
observe at least one dynamic parameter and at least one static parameter;
generate weights for a plurality of machine instances based at least in part on the at least one dynamic parameter and the at least one static parameter;
generate a ranking the plurality of machine instances and a plurality of clutches based at least in part on the weights;
determine an identified machine instance of the plurality of machine instances based at least in part on the ranking and the plurality of clutches; and
provision the identified machine instance to perform at least one task, wherein the at least one task comprises a logarithmic task configured to use all available resources in a pool of the plurality of machine instances, wherein the logarithmic task corresponds to a logarithmic utility function represented by:

$$U_k(v_k) = \frac{\log(1 + m_k v_k)}{\log(1 + m_k v_{max})},$$

where $v_{max}$ is a point where the logarithmic task uses all available resources, $v_k$ represents the virtual data center allocated by the controller to the $k^{th}$ service, and $m_k$ is the rate of increasing utility percentage with the allocated rate $v_k$.

* * * * *